United States Patent
Zhou

(10) Patent No.: US 11,628,453 B2
(45) Date of Patent: Apr. 18, 2023

(54) WATER OUTLET DEVICE AND SHOWER

(71) Applicants: Xiamen Water Nymph Sanitary Technology Co., Ltd., Xiamen (CN); Huaqiang Zhou, Xiamen (CN)

(72) Inventor: Huaqiang Zhou, Xiamen (CN)

(73) Assignees: Xiamen Water Nymph Sanitary Technology Co., Ltd., Xiamen (CN); Huaqiang Zhou, Xiamen (CN)

( * ) Notice: Subject to any disclaimer, the term of this patent is extended or adjusted under 35 U.S.C. 154(b) by 204 days.

(21) Appl. No.: 17/133,962

(22) Filed: Dec. 24, 2020

(65) Prior Publication Data
US 2021/0205825 A1 Jul. 8, 2021

(30) Foreign Application Priority Data
Jan. 6, 2020 (CN) .......................... 202020017196.6

(51) Int. Cl.
*B05B 1/18* (2006.01)
*E03C 1/04* (2006.01)

(52) U.S. Cl.
CPC ............ *B05B 1/185* (2013.01); *E03C 1/0404* (2013.01); *E03C 1/0408* (2013.01)

(58) Field of Classification Search
CPC .................................................... B05B 1/185
USPC ... 4/676, 677, 678, 675, 567, 584, 596, 615, 4/624, 653, 668, 671; 137/615, 800, 801, 137/861; 251/153, 155, 340, 349
See application file for complete search history.

(56) References Cited

U.S. PATENT DOCUMENTS

| | | | | |
|---|---|---|---|---|
| 4,360,160 A | * | 11/1982 | Jette ...................... | B05B 1/3026 239/289 |
| 4,398,668 A | * | 8/1983 | Jette ...................... | B05B 15/654 4/596 |
| 2006/0200904 A1 | * | 9/2006 | Vogel .................... | E03C 1/0402 4/695 |
| 2009/0139024 A1 | * | 6/2009 | Vogel .................... | E03C 1/2302 137/15.01 |
| 2015/0351592 A1 | * | 12/2015 | Braic ................... | A47K 5/1214 4/675 |
| 2018/0058050 A1 | * | 3/2018 | Wu ......................... | G01F 15/06 |
| 2021/0148099 A1 | * | 5/2021 | Zhou ..................... | F16K 31/58 |

FOREIGN PATENT DOCUMENTS

CN 106694260 A * 5/2017
DE 202004016788 U1 * 1/2005 ............. B05B 1/185

* cited by examiner

*Primary Examiner* — Lori L Baker
(74) *Attorney, Agent, or Firm* — Westbridge IP LLC

(57) ABSTRACT

A water outlet device includes a ball component. The ball component comprises a ball rod and a ball. Two water ports and a water channel located between the two water ports are sequentially formed in the ball rod. An angle is formed between the directions of the two water ports. The ball is arranged on at least one water port. The water channel penetrates through the ball. The two water ports having an angle formed between water flow directions thereof are formed in the water channel of the ball rod, so that the water outlet direction of the water outlet device can be adjusted to be upward, and the water outlet angle can be adjusted to some extent.

8 Claims, 8 Drawing Sheets

WATER OUTLET DEVICE AND SHOWER

CROSS-REFERENCE TO RELATED APPLICATIONS

The application claims priority to Chinese patent application CN 202020017196.6, filed on Jan. 6, 2020, the entire contents of which are incorporated herein by reference.

TECHNICAL FIELD

The invention relates to the technical field of bath products, in particular to a water outlet device and a shower.

BACKGROUND

Existing water outlet devices provided with a ball are typically designed in such a manner that the ball is rotatably connected to a water outlet end or a water inlet end to change the water outlet direction to some extent. Before using water to rinse their mouth or wash their face in daily life, users have to receive water from the water outlet devices with the ball, which is extremely inconvenient.

SUMMARY

The technical issue to be settled by the invention is to provide a water outlet device which is able to discharge water upwards and downwards, and a shower.

To settle the aforesaid technical issue, the technical solution adopted by the invention is as follows: a water outlet device comprises a ball component, the ball component comprises a ball rod and a ball, two water ports and a water channel located between the two water ports are sequentially formed in the ball rod, and an angle is formed between the directions of the two water ports.

The ball is arranged on at least one of the water ports, and the water channel penetrates through the ball.

The water outlet device may further comprise a water outlet component, and the ball is arranged in the water outlet component and is rotatably connected to the water outlet component.

The water outlet component may be a bubbler.

The water outlet device may further comprise a connecting piece, the ball is arranged on one of the two water ports, and the connecting piece is arranged on the other water port.

Balls may be arranged on the two water ports respectively.

The water outlet device may further comprise a connecting piece, and any one of the balls is arranged in the connecting piece and is rotatably connected to the connecting piece.

The angle between the directions of the two water ports may range from 30° to 150°.

The water channel may be coaxial with the central axis of the ball rod.

The invention further relates to a faucet comprising a water outlet end and the water outlet device, and the other end of the ball rod is connected to the water outlet end.

The invention further relates to a shower comprising a lower water outlet end and the water outlet device, and the other end of the ball rod is connected to the lower water outlet end.

The invention has the following beneficial effects: two water ports having an angle formed between the water flow directions thereof are formed in the water channel of the ball rod, and a first ball is arranged on a first ball rod and is rotatably connected to a water supply device or a water outlet component, so that the water outlet direction of the water outlet device can be adjusted to be upward, and the water outlet angle can be adjusted to some extent.

DETAILED DESCRIPTION OF THE EMBODIMENTS

Figure 1:
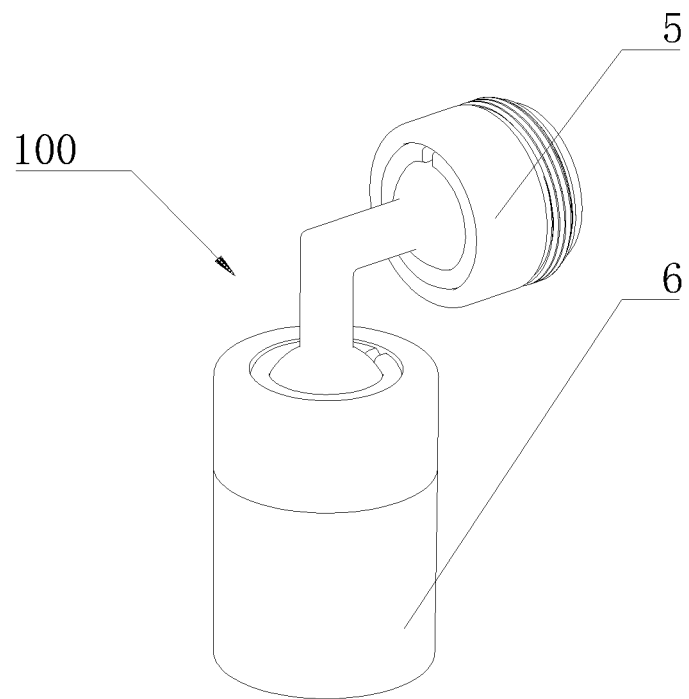
FIG. 1 is a structural view of a water outlet device in Embodiment 1 of the invention.

The technical contents, purposes and effects of the invention will be described in detail below in conjunction with the embodiments and accompanying drawings.

The key concept of the invention lies in that two water ports having an angle formed between water flow directions thereof are formed in a water channel to allow the water outlet direction of a water outlet device to be adjusted to be upward.

Referring to FIG. 1 to FIG. 6, a water outlet device comprises a ball component, the ball component comprises a ball rod and a ball, two water ports and a water channel located between the two water ports are sequentially formed in the ball rod, and an angle is formed between the directions of the two water ports.

The ball is disposed on at least one of the water ports, and the water channel penetrates through the ball.

From the above description, the invention has the following beneficial effects: the two water ports having an angle formed between the water flow directions thereof are formed in the water channel of the ball rod, and a first ball is arranged on a first ball rod and is rotatably connected to a water supply device or a water outlet component, so that the water outlet direction of the water outlet device can be adjusted to be upward, and the water outlet angle can be adjusted to some extent.

The water outlet device may further comprise a water outlet component, and the first ball is arranged in the water outlet component and is rotatably connected to the water outlet component.

From the above description, the first ball is arranged in the water outlet component, so that the water outlet direction of the water outlet component can be adjusted by means of the rotation of the first ball.

The water outlet component may be a bubbler.

The water outlet device may further comprise a connecting piece arranged at the other end of the ball rod.

From the above description, the connecting piece is arranged at the other end of the ball rod, and the connecting piece and the first ball are separately connected to the water outlet component and the water supply device and are separately used as a water inlet end and a water outlet end of the water outlet device.

A second ball may be arranged at the other end of the ball rod, and the water channel penetrates through the second ball.

From the above description, the second ball is arranged at the other end of the ball rod, and the first ball and the second ball can be separately connected to the water supply device and the water outlet component and are separately used as a water inlet end and a water outlet end of the water outlet device, so that bidirectional rotation of the ball rod can be realized, and the water outlet direction can be selected more flexibly.

The water outlet device may further comprise a connecting piece, and one of the first ball and the second ball is arranged in the connecting piece and is rotatably connected with the connecting piece.

From the above description, either the first ball or the second ball is arranged in the connecting piece and can be connected to the water outlet component through the connecting piece to serve as a water outlet end of the water outlet device or be connected to the water supply device to serve as a water inlet end of the water outlet device.

The angle between the directions of the two water ports may range from 30° to 150°.

From the above description, the angle between the water flow directions of the two water ports ranges from 30° to 150°, so that the water outlet direction of the water outlet device can be adjusted to be more suitable for the using habits of customers; in addition, when the water outlet direction of the water outlet device is adjusted to be upward, discharged water can be prevented from splashing.

The water channel may be coaxial with the central axis of the ball rod.

The invention further relates to a faucet comprising a water outlet end and a water outlet device, and the other end of the ball rod is connected to the water outlet end.

From the above description, the water outlet device is connected to the water outlet end of the faucet, so that the water outlet direction of the faucet can be adjusted.

The invention further relates to a shower comprising a lower water outlet end and a water outlet device, and the other end of the ball rod is connected to the lower water outlet end.

From the above description, the water outlet device is connected to the lower water outlet end of the shower, so that the water outlet direction of the lower end of the shower can be adjusted.

Figure 2:
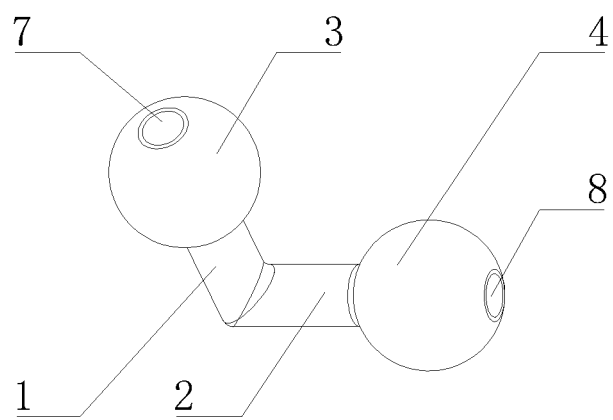
FIG. 2 is a structural view of a ball component in FIG. 1.

Referring to FIG. 1 and FIG. 2, Embodiment 1 of the invention is as follows:

A water outlet device 100 comprises a ball component, a connecting piece 5 and a water outlet component 6. The ball component comprises a first ball rod 1, a first ball 3, a second ball rod 2 and a second ball 4. One end of the first ball rod 1 is fixedly connected to one end of the second ball rod 2.

As shown in FIG. 2, the first ball 3 is arranged at the other end of the first ball rod 1, a first water channel 7 penetrating through the first ball 3 is formed in the first ball rod 1, the second ball 4 is arranged at the other end of the second ball rod 2, a second water channel 8 penetrating through the second ball 4 is formed in the second ball rod 2, the first water channel 7 is communicated with the second water channel 8, and a 90° angle is formed between the direction of a water port of the first water channel 7 and the direction of a water port of the second water channel 8.

When the water outlet device discharges water upwards, the 90° angle between the directions of the two water ports can prevent water from splashing.

The first water channel 7 is coaxial with the central axis of the first ball rod 1, and the second water channel 8 is coaxial with the central axis of the second ball rod 2.

In this embodiment, the first ball rod and the second ball rod are defined only for the purpose of identification, and are not specified ball rods. The first ball rod may be referred to as the second ball rod, and the second ball rod may be referred to the first ball rod. Similarly, the first ball and the second ball, the first water channel and the second water channel, and other characteristics can also be exchanged, accordingly.

The connecting piece 5 is a hollow structure having two ends formed with openings, and the second ball 4 is disposed in the connecting piece 5 through an annular sealing element and is able to rotate in a cavity defined by the connecting piece 5 and the sealing element.

The water outlet component 6 is a bubbler, and the first ball 3 is disposed in the bubbler through an annular sealing element and is able to rotate in a cavity defined by the bubbler and the sealing element.

The connecting piece 5 is communicated with a water outlet end of a water supply device.

Figure 3:
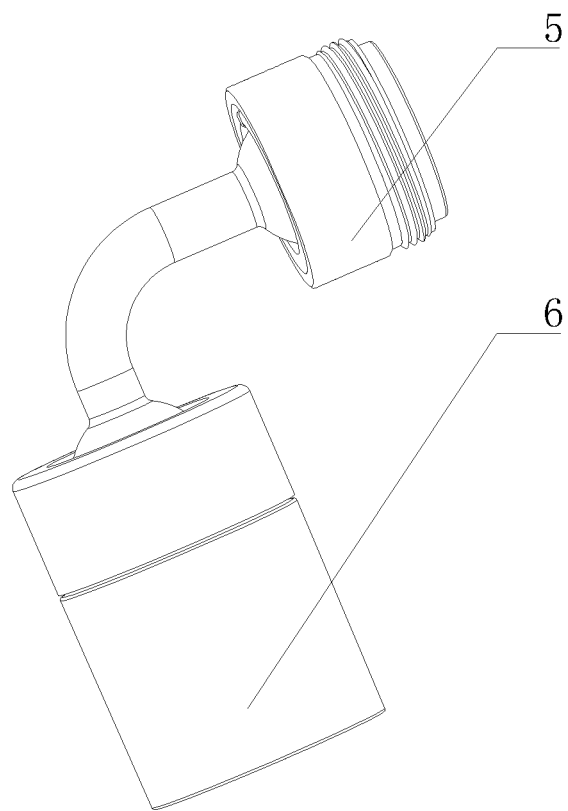
FIG. 3 is a structural view of a water outlet device in Embodiment 2 of the invention.
Figure 4:
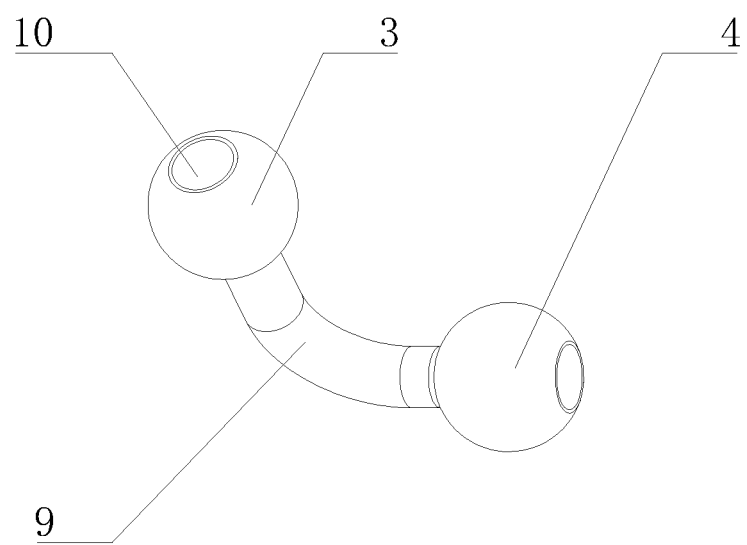
FIG. 4 is a structural view of a ball component in FIG. 3.

Referring to FIG. 3 and FIG. 4, Embodiment 2 of the invention is as follows:

Referring to Embodiment 1, Embodiment 2 differs from Embodiment 1 in the following aspects:

The ball rod comprises an arc ball rod 9, a first ball 3 and a second ball 4. Two water ports and an arc water channel 10 located between the two water ports are sequentially formed in the arc ball rod 9, and a 90° angle is formed between the directions of the two water ports.

The first ball 3 and the second ball 4 are disposed on the two water ports respectively, and the arc water channel 10 penetrates through the first ball 3 and the second ball 4.

The arc water channel 10 is coaxial with the central axis of the arc ball rod 9.

Figure 5:
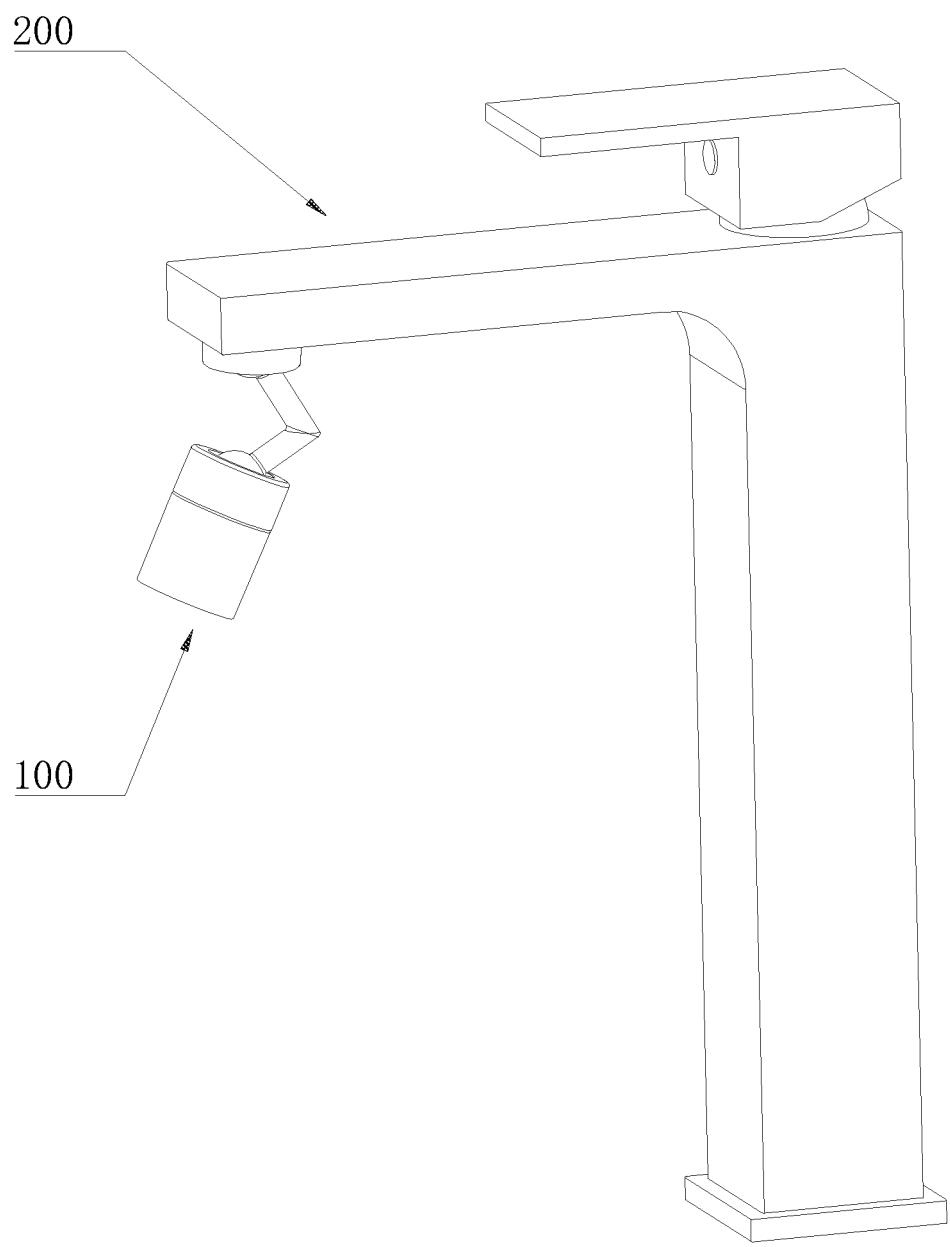
FIG. 5 is a structural view of a faucet with a water outlet device in Embodiment 2 of the invention.
Figure 6:
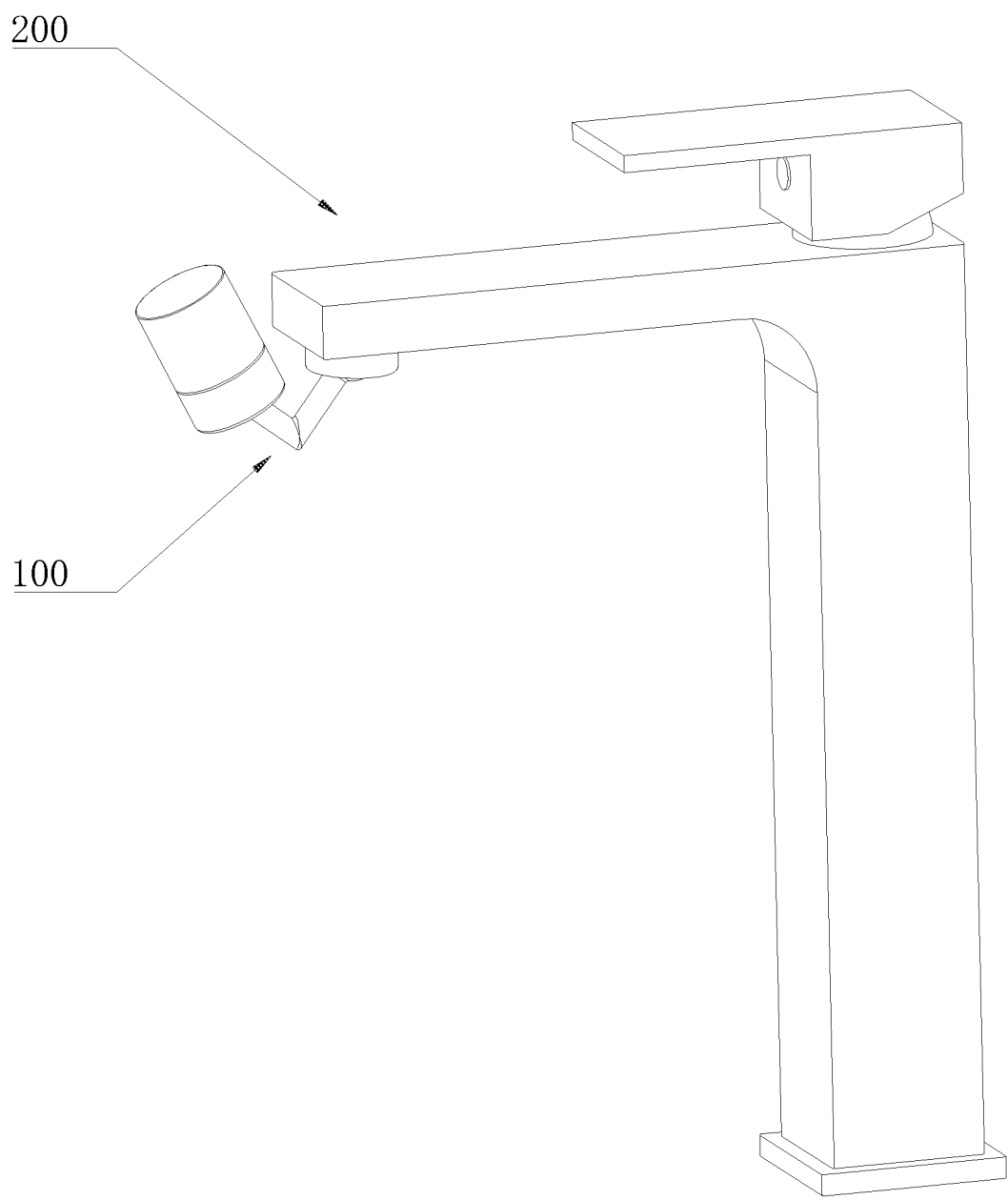
FIG. 6 is a structural view of the water outlet device in FIG. 5 in a state of discharging water upwards.

Referring to FIG. 5 and FIG. 6, Embodiment 3 of the invention is as follows:

Referring to Embodiment 1, Embodiment 3 differs from Embodiment 1 in the following aspects:

A faucet 200 comprises a water outlet end and the water outlet device, and a connecting piece 5 arranged on the water outlet device 100 is fixedly connected to the water outlet end of the faucet 200.

When water needs to be discharged downwards, the first ball 3 and the second ball 4 are rotated to adjust the water outlet device 100, as shown in FIG. 5, and at this moment, the water outlet direction of the bubbler is downward.

When water needs to be discharged upwards, the first ball 3 and the second ball 4 are rotated to adjust the water outlet device 100, as shown in FIG. 6, and at this moment, the water outlet direction of the bubbler is upward.

Figure 7:
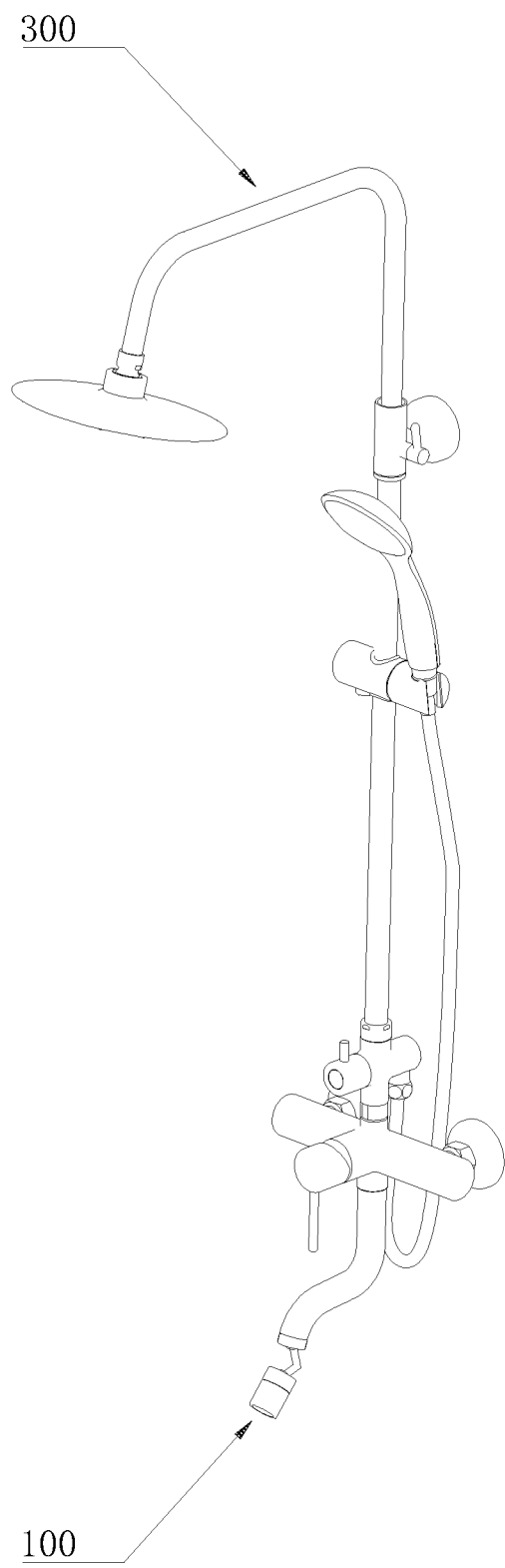
FIG. 7 is a structural view of a shower provided with a drain pipe and a water outlet device in Embodiment 3 of the invention.
Figure 8:
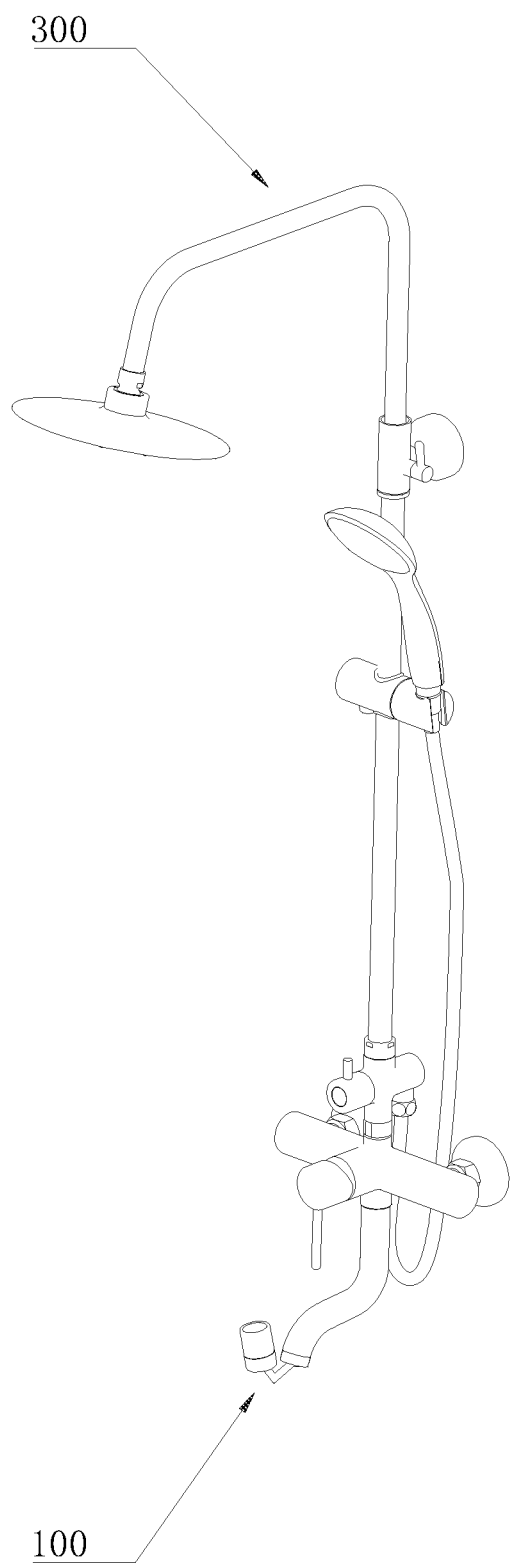
FIG. 8 is a structural view of the water outlet device in FIG. 7 in a state of discharging water upwards.

Referring to FIG. 7 and FIG. 8, Embodiment 4 of the invention is as follows:

Referring to Embodiment 1, Embodiment 4 differs from Embodiment 1 in the following aspects:

A shower provided with a drain pipe 300 comprises a water outlet end and the water outlet device, and a connecting piece 7 arranged on the water outlet device 100 is connected to the water outlet end of the shower provided with a drain pipe 300.

When water needs to be discharged downwards, the first ball 3 and the second ball 4 are rotated to adjust the water outlet device 100, as shown in FIG. 7, and at this moment, the water outlet direction of the bubbler is downward.

When water needs to be discharged upwards, the first ball 3 and the second ball 4 are rotated to adjust the water outlet device 100, as shown in FIG. 8, and at this moment, the water outlet direction of the bubbler is upward.

Figure 9:
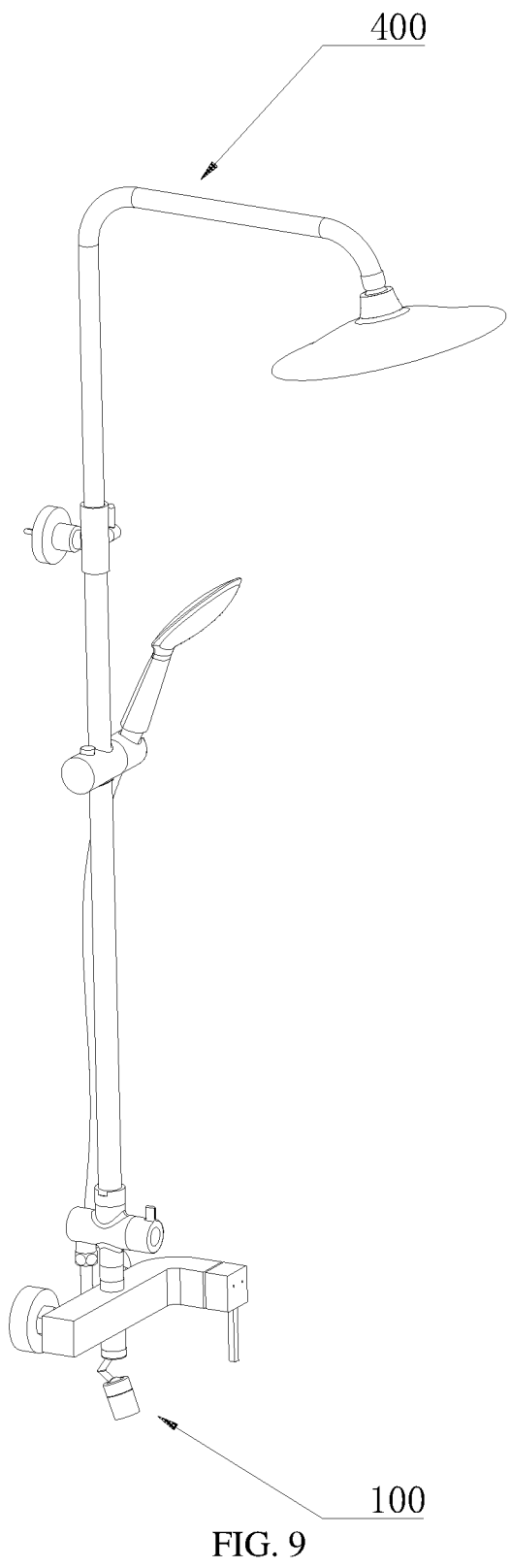
FIG. 9 is a structural view of a shower not provided with a drain pipe and provided with a water outlet device in Embodiment 3 of the invention.
Figure 10:
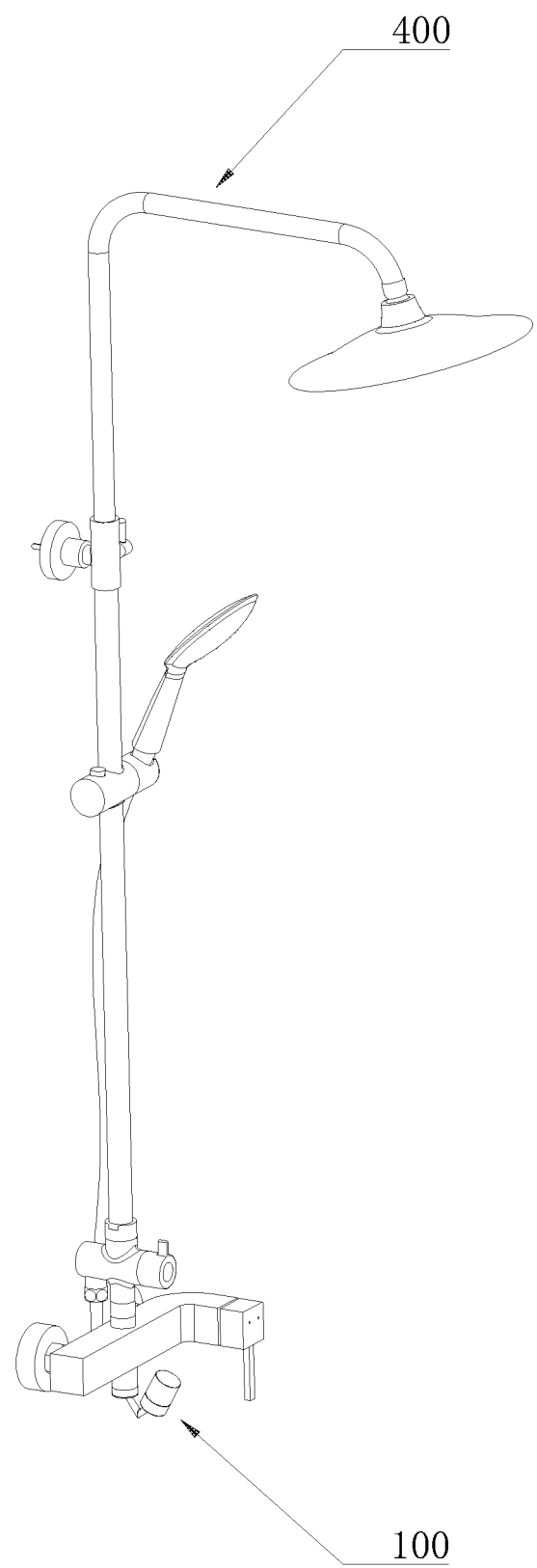
FIG. 10 is a structural view of the water outlet device in FIG. 9 in a state of discharging water upwards.

Referring to FIG. 9 and FIG. 10, Embodiment 5 of the invention is as follows:

Referring to Embodiment 1, Embodiment 5 differs from Embodiment 1 in the following aspects:

A shower not provided with a drain pipe 400 comprises a water outlet end and the water outlet device, and a connecting piece 5 arranged on the water outlet device 100 is connected to the water outlet end of the shower not provided with a drain pipe 400.

When water needs to be discharged downwards, the first ball 3 and the second ball 4 are rotated to adjust the water outlet device 100, as shown in FIG. 9, and at this moment, the water outlet direction of the bubbler is downward.

When water needs to be discharged upwards, the first ball 3 and the second ball 4 are rotated to adjust the water outlet device 100, as shown in FIG. 10, and at this moment, the water outlet direction of the bubbler is upward.

To sum up, according to the water outlet device, the faucet and the shower that can discharge water upwards, two water ports having an angle formed between water flow directions thereof are formed in a water channel of a ball rod, and a first ball and a second ball are separately arranged at two ends of the ball rod and are rotatably arranged in a water supply device and a water outlet component, so that the water outlet direction of the water outlet device can be adjusted to be upward, and the water outlet angle can be adjusted to some extent.

The above description is merely used to explain the embodiments of the invention, and is not intended to limit the patent scope of the invention. All equivalent transformations made according to the contents of the specification and the accompanying drawings, or direct or indirect applications to relating technical fields should also fall within the patent protection scope of the invention.

What is claimed is:

1. A water outlet device, comprising a ball component, wherein the ball component comprises a ball rod and a ball, two water ports and a water channel located between the two water ports are sequentially formed in the ball rod, and an angle is formed between directions of the two water ports;
the ball is arranged on at least one of the water ports, and the water channel penetrates through the ball.

2. The water outlet device according to claim 1, further comprising a water outlet component, wherein the ball is arranged in the water outlet component and is rotatably connected to the water outlet component.

3. The water outlet device according to claim 2, wherein the water outlet component is a bubbler.

4. The water outlet device according to claim 1, further comprising a connecting piece, wherein the ball is arranged on one of the two water ports, and the connecting piece is arranged on the other water port.

5. The water outlet device according to claim 1, wherein balls are arranged on the two water ports respectively.

6. The water outlet device according to claim 5, further comprising a connecting piece, and any one of the balls is arranged in the connecting piece and is rotatably connected to the connecting piece.

7. The water outlet device according to claim 1, wherein the angle between the directions of the two water ports ranges from 30° to 150°.

8. The water outlet device according to claim 1, wherein the water channel is coaxial with a central axis of the ball rod.

\* \* \* \* \*